Oct. 10, 1961 T. A. WILSON 3,004,253
IFF SYSTEM
Filed Dec. 20, 1954
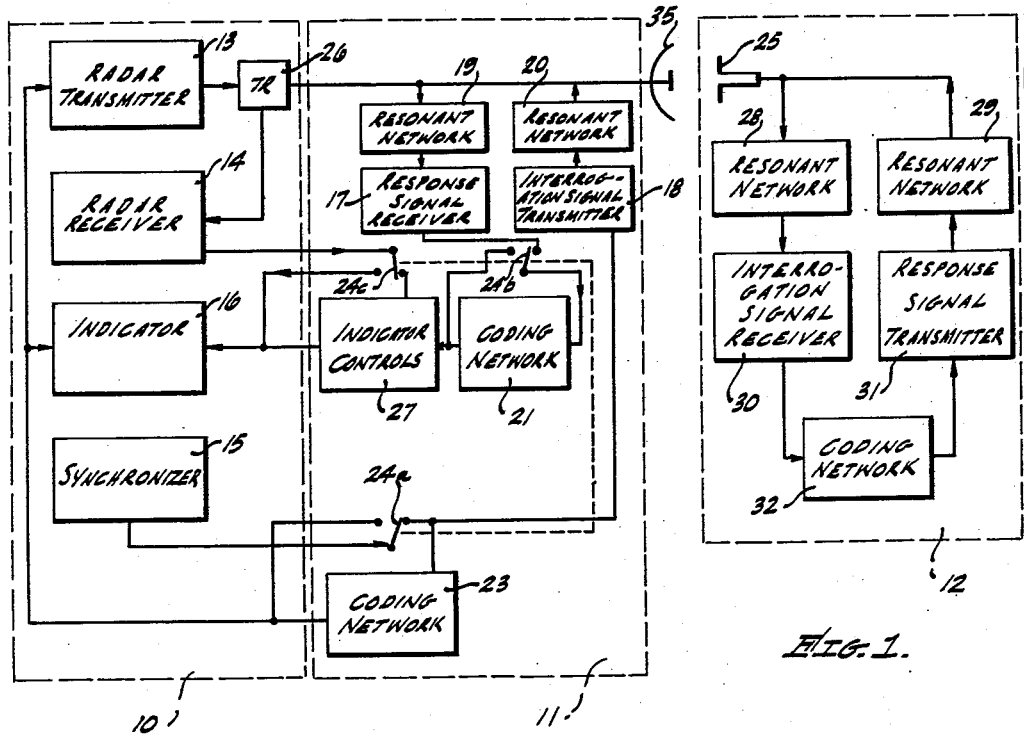
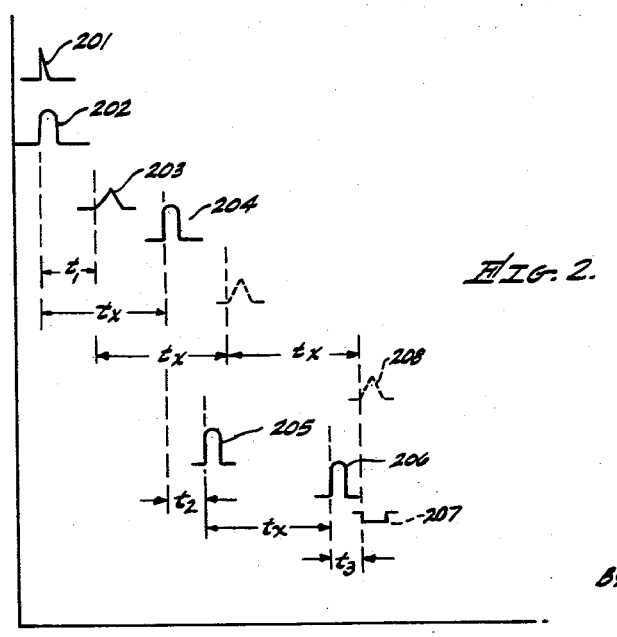
FIG. 1.
FIG. 2.
INVENTOR.
TECK A. WILSON,
BY
Henry Hayman
ATTORNEY.

United States Patent Office 3,004,253
Patented Oct. 10, 1961

3,004,253
IFF SYSTEM
Teck A. Wilson, Playa Del Rey, Calif., assignor to Hughes Aircraft Company, Culver City, Calif., a corporation of Delaware
Filed Dec. 20, 1954, Ser. No. 476,283
1 Claim. (Cl. 343—6.5)

This invention relates to aircraft identification systems, and in particular to an electronic identification system for use with a radar system to provide an identification of aircraft represented by radar echo indications by acting upon the radar indicator display of said echo indications.

In military air operations in which a radar equipped aircraft seeks out targets in the air, the pilot is aided in determining whether echo indications on his radar indicator screen are those of friendly or unfriendly aircraft by an interrogation-responsor system, commonly known as "IFF," which stands for "Identification, Friend or Foe." The searching craft sends out an interrogation signal. In response to this signal, a friendly craft, which is equipped with a "transponder," transmits appropriate identifying response signals. The response signals received are utilized for such purposes as causing a panel lamp to light up in the cockpit of the searching craft or to deactivate the electric control system for the guns on the searching craft. This of course means that the operator's attention must be diverted momentarily from his indicator screen to determine what is the result of the interrogation.

It is an object of this invention to provide an improved system for interrogation of aircraft, which will permit the operator to determine the results of interrogation substantially instantaneously.

It is a further object of this invention to provide an improved identification system for aircraft whereby the identification of a friendly aircraft is manifested on the radar indicator screen itself.

The novel features which are believed to be characteristic of the invention, both as to its organization and method of operation, together with further objects and advantages thereof, will be better understood from the following description considered in connection with the accompanying drawing made part of this specification in which a preferred embodiment of the invention is illustrated by way of example. It is to be expressly understood, however, that the drawing is for the purpose of illustration and description only, and is not intended as a definition of the limits of the invention. The scope of the invention is pointed out in the appended claim.

In the drawing,

FIG. 1 is an overall block diagram of the IFF system of this invention incorporated in a radar system; and FIG. 2 illustrates waveforms to explain the operation of the system of FIG. 1.

Briefly, the improved aircraft identification system of this invention is an IFF system incorporated in a radar system of a searching aircraft to affect the target echo indications on the radar indicator screen of the searching aircraft so that those from friendly aircraft are identified and distinguished from those which are received from unfriendly aircraft.

Referring now to FIG. 1, a radar system 10 which may be one of any conventional type, includes at least a transmitter 13, a receiver 14, a synchronizer 15 and an indicator 16. Transmitter 13 is coupled to receiver 14 and to an antenna 35 through a transmit-receive coupler or TR switch 26.

A response signal receiver 17 and an interrogation signal transmitter 18 of interrogator responsor 11 are coupled through respective resonant networks 19 and 20 to antenna 35.

A coding network 21 is adapted by means of a switch 24b, to be connected between the output of the response signal receiver 17 and the indicator controls 27, or to be short circuited.

Another coding network 23 is adapted by means of a switch 24a, either to be connected between synchronizer 15 and radar transmitter 13, and to permit synchronizer 15 to be coupled to interrogation signal transmitter 18, or to be disconnected to permit synchronizer 15 to be connected directly to radar transmitter 13.

The indicator controls 27 that, as explained above, has one input connected to the output of the first coding network 21, has a second input arranged to be connected by a third switch 24c to the output of the radar receiver 14. The indicator controls 27 is a blanking circuit and may be of the type shown in FIG. 3 of U.S. Patent 2,517,752 to Wolff. The output of the indicator controls 27 is connected to the indicator 16 so that a pulse from the radar receiver 14 is applied to the indicator 16 by the indicator controls 27 unless a pulse occurs simultaneously at the output of the coding network 21. In the other position of the third switch 24c, the output of the radar receiver 14 is disconnected from the input of the indicator controls 27 and is connected directly to the indicator 16.

The transponder 12 includes antenna 25, which may be of any suitable type to be utilized in connection with the desired frequency range of the identification system.

Antenna 25 is coupled through respective resonant networks 28 and 29 to an interrogation signal receiver 30 and a response signal transmitter 31. Interrogation signal receiver 30 is responsive to signals from interrogation transmitter 18. Transmitter 31 and receiver 30 are coupled together by a coding network 32.

The operation of the system of this invention may be understood with reference to the structure as defined above and shown in FIG. 1, and with further reference to the illustrated waveforms of FIG. 2, in which the time and sequence of occurrence of the various signals involved in the operation of this system are indicated.

The radar set is synchronized in a conventional manner by a master trigger pulse 201 from synchronizer 15. The trigger pulse is normally applied directly to the radar transmitter 13 and to the indicator circuits 16. As previously indicated, the output of the synchonizer 15 is applied to switch 24a so that, by appropriately positioning the switch, the synchronizing signals may be applied to the radar transmitter 13 either directly or through coding network 23. When it is desired to interrogate, switch 24b is operated with switch 24a and switch 24c so that coding network 21 is connected between the response signal receiver 17 and the indicator controls 27 when coder 23 is connected between synchronizer 15 and radar transmitter 13 and the indicator control 27 is connected between the radar receiver 14 and the indicator 16. When the coders are thus connected for interrogation, synchonizer 15 triggers the interrogation signal transmitter 18, following which coder 23 causes the radar transmitter 13 to be triggered. At the same time as transmitter 13 is triggered, the sweep and control circuits of the radar indicator 16 are set in operation.

During interrogation, the master trigger pulse 201 initiates the operation of the interrogation signal transmitter 18 to produce at the trigger initiation time an interrogation to produce at the trigger initiation time an interrogation signal 202. A precise time later, ($t_1$ in FIG. 2) as a result of the operation of coding network 23, the radar transmitter 13 is triggered to produce radar signal 203.

The interrogation signal 202 is received by the transponder antenna 25 of the responding aircraft within a time (designated as $t_x$ in FIG. 2), that it takes the signal 202 transmitted by the interrogating craft to reach the interrogated craft. This time interval, $t_x$, is also the same time required for the radar signal 203 to be transmitted from the interrogating to the interrogated craft. Thus, the time $t_x$ may be considered the time equivalent to the radar range. Since there is a delay $t_1$ between the transmission of the interrogation signal 202 and radar signal 203, then $t_1 + t_x$ represents the time interval between the operation of the master trigger and the arrival of the radar signal at a target. For the example under consideration, the target is an aircraft with transponder equipment such as 12.

The received interrogation signal 204 is applied through resonant network 28 to interrogation signal receiver 30. The signal which appears at the output of receiver 30 is applied to coding network 32. Network 32 may be employed to generate any predetermined time delay code and applies a signal pulse 205 to response signal transmitter 31 which is delayed a time $t_2$ with respect to the received interrogation signal 204. Pulse 205 also represents the pulse transmitted by transmitter 31 through resonant network 29 and antenna 25. The transmitted pulse 205 arrives at the interrogating aircraft following an interval $t_x$ (representing the target range) and is received at the response signal receiver 17 as signal 206. It should be noted here that the Doppler effect will vary the time interval to a slight degree, but since all of the delays imparted to the various signals involved in the operation of the system of this invention are of the order of microseconds of time, and the pulse durations are substantially long, Doppler effects will not in any way alter the operation of the system of this invention. The radar echo signal, shown as dotted signal pulse 208, will not yet have been received, according to the code set up for this example; accordingly, signal 206 is delayed a predetermined time $t_3$ by the action of coding network 21 to be applied to indicator controls 27 as blocking pulse 207 coincident with the arrival of the radar echo signal 208. Thus there will be a time interval between the transmission of an interrogation signal 202 and the generation of a radar echo indication blocking pulse 207 equal to $2t_x + t_2 + t_3$. The time interval between the radar signal 203 and the echo pulse 208 coincident with blocking pulse 207 is equal to $2t_x$.

Since the pulse 203 was originally delayed by an interval $t_1$, and since $t_1 = t_2 + t_3$, then when this is added to the last sum of the time intervals it is found to be equal to matching the time of the interrogation response code.

The timing codes set up in networks 21, 23 and 32 respectively, are related and may be set up in any manner of the several combinations in which $t_1$ the radar delay of coding network 23 is equal to the sum of the delays in networks 32 and 21 corresponding to $t_3$ and $t_2$, respectively.

There has been described an identification system by which one craft employing radar may identify another when radar echoes are received from the other craft and indications thereof are displayed on the interrogating craft's radar screen. When the responding craft signals a response having the proper code, the display of this particular responding craft's echo is eliminated from the radar screen.

While the discussion of the equipment has been limited to aircraft it should be clearly understood that the system may be installed as well in ships at sea, or on land for interrogation of other ships or aircraft or vehicles on the land.

The other craft or vehicles may respond with equipment such as the transponder described above.

What is claimed is:

An identification device for determining whether a target is friend or foe, said identification device being adapted to be used in conjunction with a rader search system which includes a radar transmitter and a radar receiver coupled through a transmit-receive switch to an antenna for transmitting exploratory pulses and receiving echo signals in response thereto, an indicator coupled to said radar receiver for producing a visual presentation of said echo signals, and a master synchronizer coupled to said radar transmitter and said indicator for initiating the transmission of said exploratory pulses and the sweep circuits of said indicator, respectively, said identification device comprisng: an interrogating transmitter coupled to said antenna for transmitting interrogating signal pulses towards a target; means for connecting said interrogating transmitter to said master synchronizer thereby to initiate the transmission of said interrogating signal pulses; a first coding network interconnected between said master synchronizer and said radar transmitter and indicator whereby said exploratory pulses are delayed by a first delay interval after the transmission of each interrogating signal pulse; apparatus disposed on board said interrogated target including an interrogating signal receiver for receiving said interrogating signal pulse, and means coupled to said interrogating signal receiver for transmitting a response signal pulse after a second delay interval subsequent to the reception of each of said interrogating signal pulses; a response signal receiver coupled to the antenna of said radar search system for receiving said response signal pulses; means responsive to said response signal pulses for producing a control voltage of short duration after a third delay interval subsequent to the reception of each response signal pulse by the interrogating signal receiver, said first delay interval being substantially equal to the sum of said second and third delay intervals whereby said control voltage is produced during an interval of time that includes the concomitant target echo signal received by the radar receiver; and means coupled between said last-named means and said indicator of said radar system for affecting the presentation of said target echo signal in response to said control voltage thereby to determine that said target is a friend.

References Cited in the file of this patent

UNITED STATES PATENTS

| | | |
|---|---|---|
| 2,515,178 | Barchok | July 18, 1950 |
| 2,517,752 | Wolff | Aug. 8, 1950 |